United States Patent [19]

Kelley et al.

[11] Patent Number: 4,749,860

[45] Date of Patent: Jun. 7, 1988

[54] METHOD OF ISOLATING A SINGLE MASS IN A QUADRUPOLE ION TRAP

[75] Inventors: Paul E. Kelley; George C. Stafford, Jr., both of San Jose; John E. P. Syka, Sunnyvale, all of Calif.

[73] Assignee: Finnigan Corporation, San Jose, Calif.

[21] Appl. No.: 871,464

[22] Filed: Jun. 5, 1986

[51] Int. Cl.⁴ .............................................. B01D 59/44

[52] U.S. Cl. .................................... 250/282; 250/292; 250/291

[58] Field of Search ......................... 250/282, 291, 292

[56] References Cited

U.S. PATENT DOCUMENTS

| | | | |
|---|---|---|---|
| 2,939,952 | 6/1960 | Paul et al. . | |
| 3,527,939 | 9/1970 | Dawson et al. . | |
| 3,742,212 | 6/1973 | McIver | 250/291 |
| 4,090,075 | 5/1978 | Brinkmann | 250/282 |
| 4,105,917 | 8/1978 | McIver et al. | 250/291 |
| 4,464,570 | 8/1984 | Allemann et al. | 250/291 |
| 4,535,236 | 8/1985 | Batey | 250/292 |
| 4,540,884 | 9/1985 | Stafford et al. | 250/292 |
| 4,650,999 | 3/1987 | Fies et al. | 250/292 |

OTHER PUBLICATIONS

"Quadrupole Mass Spectrometry and its Applications", Dawson, published by *Elsevier,* 1976, pp. 4–6, 181–224.

"Radio Frequency Quadrupole Mass Spectrometers", Lawson et al., *Chemistry in Britain,* 1972, pp. 373–380.

"The Characterisation of a Quadrupole Ion Storage Mass Spectrometer", Mather et al., *Dynamic Mass Spectrometry,* vol. 5, 1978, pp. 71–85.

*Primary Examiner*—Bruce C. Anderson

*Attorney, Agent, or Firm*—Flehr, Hohbach, Test, Albritton & Herbert

[57] ABSTRACT

Method of isolating ions of selected mass in a quadrupole ion trap of the type including a ring electrode and end caps in which RF and AC voltages are applied to the ring electrode and end caps and scanned to trap a single ion of interest.

6 Claims, 2 Drawing Sheets

METHOD OF ISOLATING A SINGLE MASS IN A QUADRUPOLE ION TRAP

The present invention is directed to a method of isolating a single mass in a quadrupole ion trap.

In U.S. Pat. No. 4,540,884, there is described a method of mass analyzing a sample by the use of a quadrupole ion trap. A wide mass range of ions of interest is created and stored in the ion trap during an ionization step. In one method the RF voltage applied to the ring electrode of the quadrupole ion trap is then increased and trapped ions of consecutively increasing specific masses become unstable and exit the trap. These ions are detected to provide an output signal indicative of the stored ion masses.

In pending application Ser. No. 738,018, assigned to a common assignee, there is disclosed a method of performing MS/MS in a quadrupole ion trap. In this method a wide mass range of ions are created and stored in the ion trap during an ionization step of the analysis in a manner similar to that disclosed in U.S. Pat. No. 4,540,884. All masses below the parent mass of interest are then eliminated from the ion trap by scanning the amplitude of the RF voltage applied to the ring electrode. At this point the parent mass of interest and other ions having masses greater than the parent remain trapped in the device.

According to the equations which govern operations of the device, ions of differing masses will have distinct and unique natural frequencies of oscillation in the ion trap. These natural frequencies depend on $\beta$ and the angular drive frequency $\omega_o$. The fundamental frequency of oscillation of a particle m/z is given by $\omega=\beta\omega_o/2$.

Once $\omega$ is determined for the parent mass of interest, a small supplemental AC voltage at this frequency is applied by a frequency synthesizer circuit to the end cap electrodes of the ion trap. This causes the parent mass to increase its trajectory and kinetic energy in the Z-direction of the ion trap. All other ions which have different masses remain unaffected by this supplemental AC field. With the increase in kinetic energy, the parent ions undergo collisions with background neutral gas molecules or atoms and fragment to smaller ions known as daughter ions. This is called collision induced dissociation (CID). After a period of time the supplemental AC voltage is turned off. The trapped daughter ions are then scanned out of the device by ramping or increasing the RF voltage applied to the ring electrode as disclosed in U.S. Pat. No. 4,540,884. This results in a mass spectrum. Alternatively the AC voltage may be changed to bring ions into resonance.

One limitation with this process is that other ions with masses greater than the parent also remain trapped in the device throughout the analysis. Reactions of these other ions with other species present could result in the appearance of masses that are not daughters of the parent of interest. Also, it is often important to isolate a single parent, say for reaction purposes.

In U.S. Pat. No. 3,527,939, there is described a method of isolating a single mass in a quadrupole ion trap. In this method a combination of AC and DC fields are applied to the ion trap during the ionization step such that only the mass of interest will have stable or bonded trajectories and will remain trapped in the device. All other masses either above or below the mass of interest will have unstable trajectories and are not trapped.

It is an object of the present invention to provide a method of isolating an ion having a particular mass of interest which utilizes only RF and AC fields in a quadrupole ion trap.

The foregoing and other objects are accomplished by a method in which a sample is ionized and trapped by the application of suitable RF voltage to the ring electrode to trap a mass range which includes the single mass which it is desired to isolate in the ion trap. Subsequently, a supplemental AC voltage is applied to the end cap such that its frequency of oscillation is the same as the frequency of oscillation of the next adjacent higher mass to resonate the higher mass out of the ion trap. Then the RF voltage applied to the ring electrode is increased to a voltage just below that at which the single mass of interest is stable whereby ions become sequentially unstable in the order of increasing mass up to below the single mass and ions of higher masses come sequentially into resonance with the supplemental AC field and are ejected from the ion trap thereby leaving the ion of the mass of interest in the trap.

The foregoing and other objects of the present invention will become more clearly understood from the following description and the accompanying drawings of which:

Figure 3:
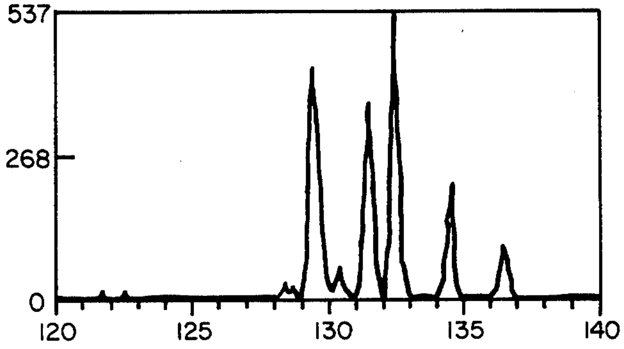

FIG. 3 shows the mass spectrum of the isotopes of xenon acquired from an ion trap operated in accordance with U.S. Pat. No. 4,540,884.

Figure 4:
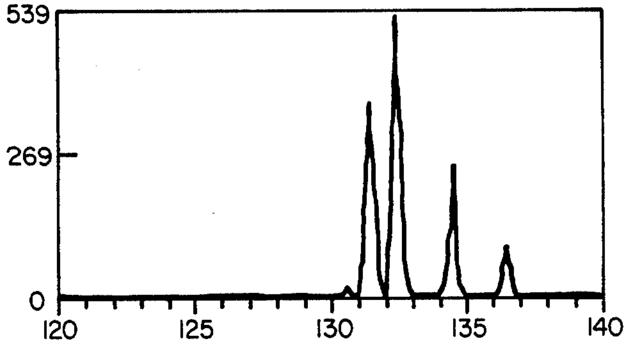

FIG. 4 shows the elimination of the masses below mass 131 by ramping the RF voltage applied to the ring electrode.

Figure 5:
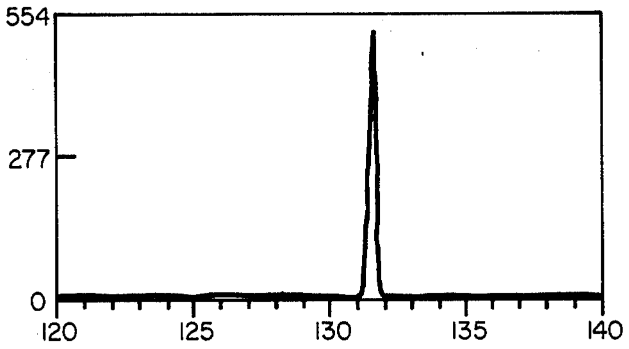

FIG. 5 shows the results of operation of the ion trap in accordance with the invention in which masses above and below mass 131 have been eliminated.

FIGS. 6A–6C illustrate the isolation of masses 79 or 85 in a mixture of protonated benzene and $d_6$-benzene.

FIGS. 7A–7C show the results of a study of the hydrogen/deuterium exchange rate in a gas phase ion-molecule reaction between protonated benzene and neutral $d_6$-benzene.

Figure 1:
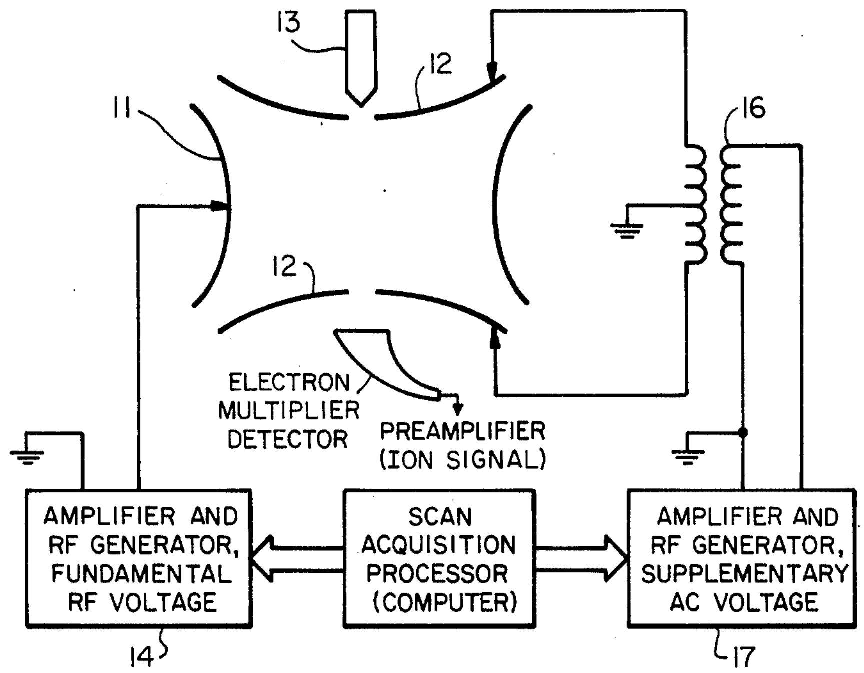
FIG. 1 is a schematic diagram of an ion trap mass spectrometer incorporating the present invention.
Figure 2:
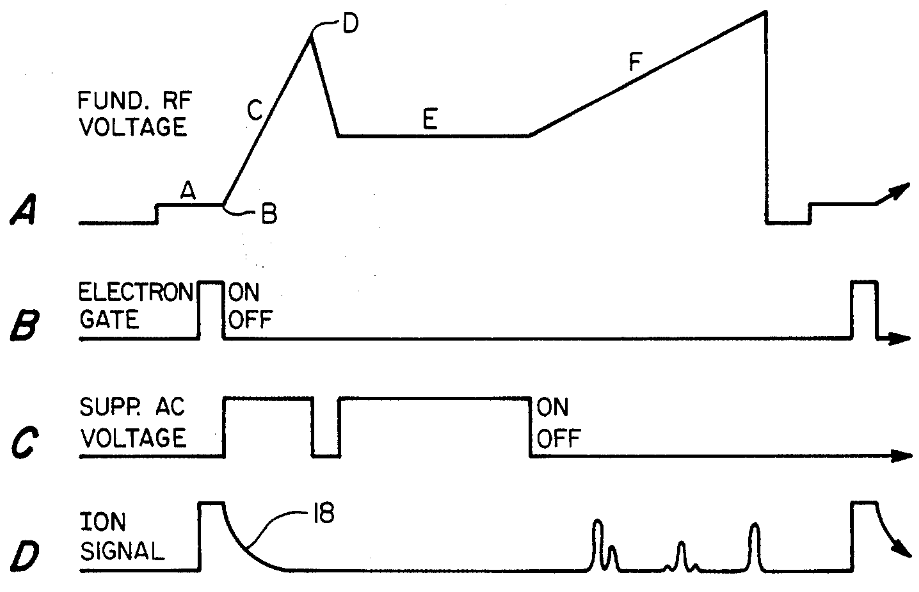
FIGS. 2A–2D are timing diagrams illustrating operation of the ion trap in accordance with the invention.

The present method of isolating the ion mass of interest includes the step of, during ionization, applying a RF voltage of fixed amplitude to the ring electrode 11 of a quadrupole ion trap, FIG. 1. This allows a wide range of ions to be created and stored in the ion trap. These ions have distinct and unique natural frequencies of oscillation in the ion trap. In the second step the ionizing electron gun 13 is turned off and ions below the parent mass of interest can be eliminated by simply ramping the amplitude of the RF voltage applied to the ring electrode 11 by the RF generator 14. The elimination of masses greater than the parent or mass of interest can be accomplished simultaneously by incorporation of a supplemental AC voltage applied to the end caps 12. Referring particularly to FIG. 1, the end caps are shown connected by a center tapped transformer 16 to supplemental RF voltage source 17. Referring to FIG. 2A, the A shows the application of the fundamental RF voltage which traps the mass range of interest. FIG. 2B shows the control of the electron gun 13 to ionize the sample. The curve 18, FIG. 2D, shows the escape of all ions which are not stable at the particular fundamental RF voltage. At point B, FIG. 2A, a supplementary AC voltage is applied to the end caps. The frequency of the supplemental AC voltage applied to the end caps is selected such that it resonates the next highest ion mass to the ion mass of interest, while maintaining the supplemental RF voltage, the fundamental RF voltage is ramped as shown at C in FIG. 2A. Masses higher than the parent come sequentially into resonance with the supplemental RF fields and are ejected from the ion trap. Also, during this scan cycle, all masses below the parent mass are expelled from the ion trap by becoming sequentially unstable so that at point D the only mass remaining is the single mass of interest. The higher masses have been expelled to an upper mass limit UML expressed as $UML=(0.908/q_{FSO})PM$ where $q_{FSO}$ is the q of the parent mass when the frequency synthesizer is first turned on. At this point what remains in the ion trap is the parent mass of interest and masses greater than the upper mass limit.

The operation from this point on depends on whatever is appropriate for the measurement being taken. Also, if it is important to eliminate the remaining masses above the upper mass limit, the RF voltage applied to the ring electrode can be held constant at Point D and the frequency of the supplemental AC can be ramped down, with sufficient amplitude at the appropriate rate. Or the frequency of the supplemental AC voltage can be ramped down, with sufficient amplitude, at the appropriate rate while the amplitude of the RF voltage applied to the ring electrode is being ramped up at an appropriate rate.

To perform a MS/MS analysis, the supplemental AC voltage is turned off at point D after the parent mass has been isolated. A supplemental AC voltage is then applied at the resonant frequency of the parent whereby the parent oscillates and generates daughter ions by collision with background neutral gas molecules or atoms to cause collision induced dissociation. The supplemental AC voltage is then turned off and the mass is scanned by again ramping the fundamental RF voltage to scan the daughter ions sequentially from the ion trap and provide a spectrum such as shown and schematically illustrated in FIG. 2D.

Xenon can be used to illustrate isolation of a single mass with only RF and AC fields. FIG. 3 shows the mass spectrum of the isotopes of xenon derived from an ion trap operated as described in U.S. Pat. No. 4,540,884. The masses below 131 are eliminated by ramping the amplitude of the RF voltage applied to the ring electrode. The resulting spectrum is shown in FIG. 4. Masses greater than 131 remain trapped. If during the same scan the supplemental RF voltage is applied at and for an appropriate time, masses above 131 are also eliminated leaving mass 131 as shown in FIG. 5.

Figure 6:
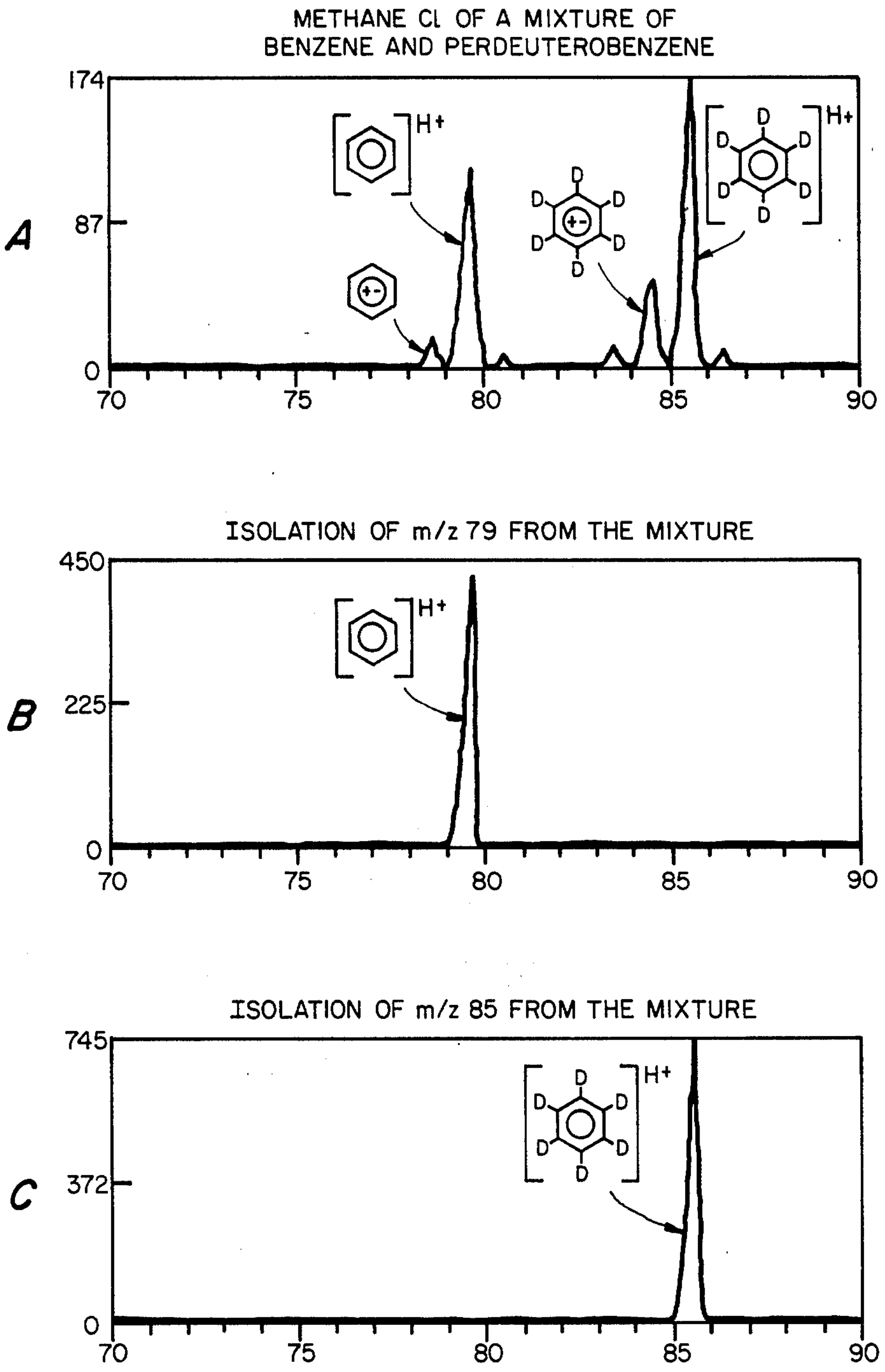
Figure 7:
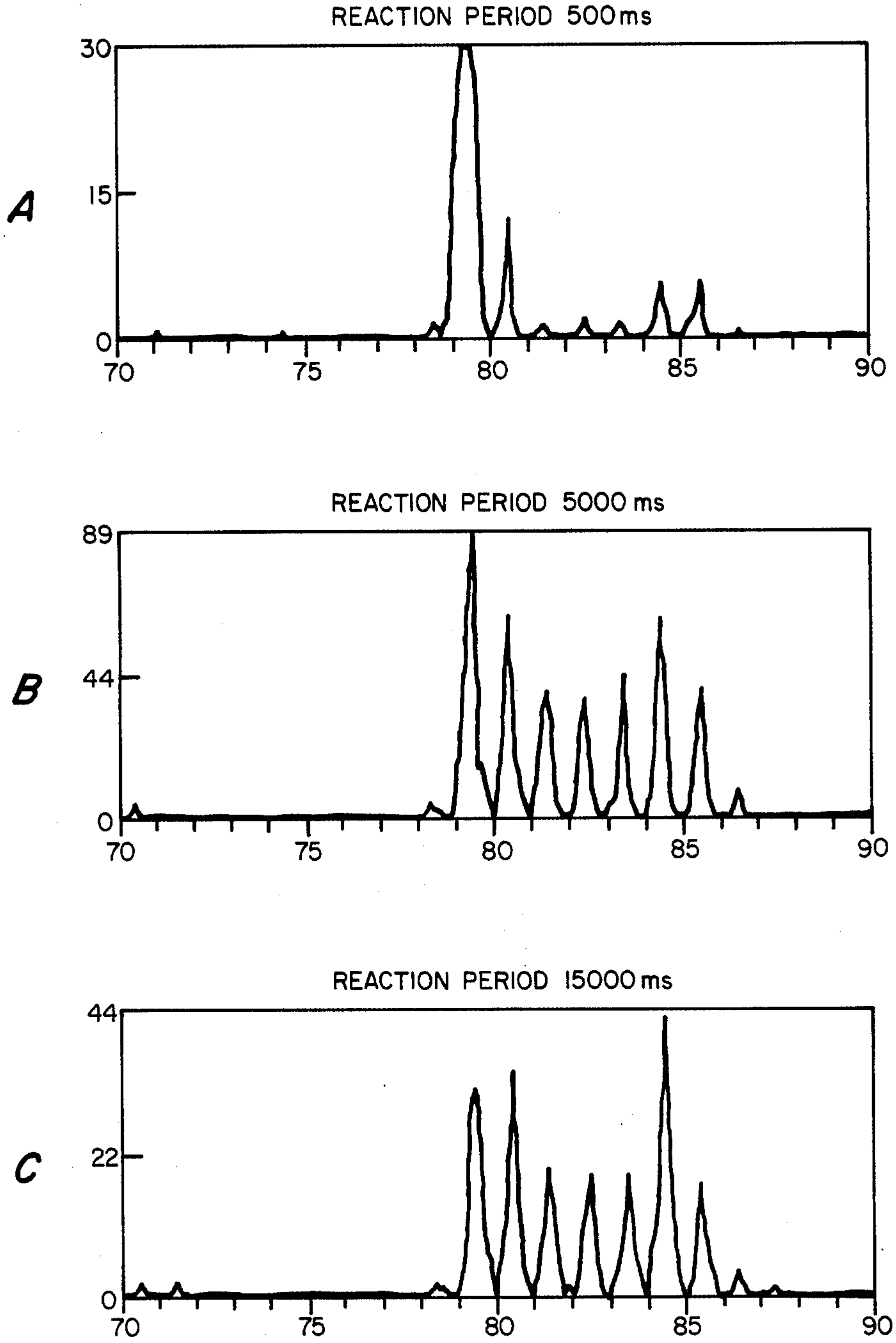

Another example of trapping a single mass in an ion trap with only RF and AC fields is shown in FIG. 6. In this example the masses 79 or 85 can be isolated from a mixture or protonated benzene and $b_6$-benzene. In this case isolation of a single mass is very important to study the hydrogen/deuterium exchange rate and the gas phase ion-molecule reactions between protonated benzene and neutral $d_6$-benzene as shown in FIG. 7.

In summary, the method disclosed herein to isolate a single mass in a quadrupole ion trap is useful in studying gas phase ion-molecule interactions or in MS/MS experiments.

What is claimed is:

1. The method of isolating an ion of selected mass in a quadrupole ion trap of the type including a ring electrode and two end caps comprising ionizing sample containing the selected ion mass in the trap, applying an RF voltage to the ring electrode to trap a mass range of interest including said single ion mass, applying a supplemental AC voltage to the end caps at a frequency selected to resonate the next highest ion mass to the ion mass of interest, scanning the amplitude of said RF voltage while the supplemental AC voltage is applied whereby ions of all masses other than the selected mass become unstable or resonate out of the trap leaving the single ion mass of interest.

2. The method of isolating an ion of selected mass in a quadrupole ion trap of the type including a ring electrode and two end caps comprising ionizing sample containing the selected mass in the trap, applying an RF voltage to the ring electrode to trap a mass range of interest including said single ion mass, applying a supplemental AC voltage to the end caps at a frequency of oscillation of a higher ion mass to the ion mass of interest to resonate said higher ion mass out of the ion trap, and increasing the RF voltage between the ring electrode and the end caps to a voltage just below that at which the single mass is stable while continuing to apply the supplemental AC voltage whereby ions become sequentially unstable in the order of increasing mass up to the single mass and ions of higher masses come sequentially into resonance with the supplemental AC field and are ejected from the ion trap leaving the single ion mass of interest.

3. The method as in claim 2, with the additional step of applying a supplemental AC field to the end caps at the resonance frequency of said selected mass to form collision induced daughter ions.

4. The method as in claim 3, including the additional step of mass analyzing the daughter ions.

5. The method as in claim 2, including the additional step of ramping down the frequency of the AC voltage while the RF voltage is maintained.

6. The method as in claim 5, including the step of ramping up the RF voltage as the AC voltage is ramped down.

* * * * *